(12) United States Patent
Shinohara

(10) Patent No.: US 7,443,611 B2
(45) Date of Patent: Oct. 28, 2008

(54) IMAGING LENS

(75) Inventor: Yoshikazu Shinohara, Saitama (JP)

(73) Assignee: Fujinon Corporation, Saitama-Shi, Saitama (JP)

(\*) Notice: Subject to any disclaimer, the term of this patent is extended or adjusted under 35 U.S.C. 154(b) by 69 days.

(21) Appl. No.: 11/477,919

(22) Filed: Jun. 30, 2006

(65) Prior Publication Data
US 2007/0014033 A1    Jan. 18, 2007

(30) Foreign Application Priority Data

Jul. 4, 2005  (JP) .................. P2005-195545

(51) Int. Cl.
*G02B 9/34*    (2006.01)
(52) U.S. Cl. .................. 359/772; 359/773; 359/774
(58) Field of Classification Search ......... 359/754–758, 359/763, 764, 766, 771–774
See application file for complete search history.

(56) References Cited

U.S. PATENT DOCUMENTS

| 6,476,982 | B1 | 11/2002 | Kawakami et al. |
| 6,795,253 | B2 | 9/2004 | Shinohara et al. |
| 6,917,479 | B2 | 7/2005 | Park et al. |
| 2004/0141242 | A1 | 7/2004 | Abe |
| 2004/0228009 | A1 | 11/2004 | Kamo et al. |
| 2007/0081259 | A1* | 4/2007 | Noda .................. 359/774 |

FOREIGN PATENT DOCUMENTS

JP   2003-322792 A   11/2003

\* cited by examiner

*Primary Examiner*—Darryl J Collins
(74) *Attorney, Agent, or Firm*—Birch, Stewart, Kolasch & Birch, LLP

(57) ABSTRACT

An imaging lens is provided and includes: a first lens of a positive lens; a second lens of a negative lens whose concave surface faces to an image side of the second lens; a third lens of a positive lens, whose both surfaces are aspheric, having a concave surface facing to an object side of the third lens; and a fourth lens of a meniscus lens, whose both surfaces are aspheric, having a convex surface facing to the object side near the optical axis, the lenses being arranged in this order from an object side, the first imaging lens satisfying the conditional expressions specified in the specification.

29 Claims, 6 Drawing Sheets

IMAGING LENS

FIELD OF THE INVENTION

The present invention relates to a compact imaging lens including a relatively small number of lenses and in particular to an imaging lens preferable as a lens for capturing an image such as one used for PCs or mobile terminals.

BACKGROUND OF THE INVENTION

In the related art, there is known a lens module that captures an image used for relatively low-profile web cameras for PCs and mobile terminals and that has three plastic lens arranged therein.

For example, the imaging lens disclosed in JP-A-2003-322792 has a short total length of the lens system including three lenses. Further, a lens having a shape whose both surfaces are aspheric is arranged closest to an image so as to reduce the incident angle of a main ray with respect to the entire imaging plane thus allowing application f an imaging element. While a single imaging lens has been used in related art in this field, the technology disclosed in JP-A-2003-322792 has made it possible to meet such needs as higher resolution of and magnification of an imaging element.

In case all of the three lenses are plastic lenses, there are variations in the focus position depending on the change in use temperature. This may be solved by introduction of the auto focus function although it is difficult to employ the auto focus function in low-profile devices such as mobile terminals. This is because of an enhanced space for a lens module, a decrease in the structural strength, a decreased mobility as a camera and increased manufacturing costs. Variations in the focus position caused by a change in temperature are solved by using three glass lenses although this approach is not favorable because of increased costs.

SUMMARY OF THE INVENTION

An object of an illustrative, non-limiting embodiment of the invention is to provide an imaging lens offering pan-focus that improves correction of aberrations such as color aberration and that suppresses variations in the focus position caused by a change in temperature while keeping small the total length of the lens.

(First Aspect)

A imaging lens according to a first aspect of the invention includes: in order from an object side of the imaging lens, first lens of a positive lens; a second lens of a negative lens having a concave surface on an image side thereof; a third lens of a positive lens having a concave surface on an object side thereof, both surfaces of the third lens being aspheric; and a fourth lens of a meniscus lens having a convex surface on an object side thereof and near an optical axis, both surfaces of the fourth lens being aspheric, the imaging lens satisfying the following conditional expressions (1) to (6).

$$0.3 < |f_1/f_2| < 0.8 \tag{1}$$

$$v_{dG1} - v_{dG2} > 25 \tag{2}$$

$$|A1| < 1.5 \times 10^{-5} \tag{3}$$

$$|A2| < 1.5 \times 10^{-5} \tag{4}$$

$$|A3| > 1.5 \times 10^{-5} \tag{5}$$

$$|A4| > 1.5 \times 10^{-5} \tag{6}$$

$f_1$: Focal length of the first lens
$f_2$: Focal length of the second lens
$v_{dG1}$: Abbe number of the first lens
$v_{dG2}$: Abbe number of the second lens
A1: Linear coefficient of expansion of the first lens
A2: Linear coefficient of expansion of the second lens
A3: Linear coefficient of expansion of the third lens
A4: Linear coefficient of expansion of the fourth lens (Second Aspect)

A imaging lens according to a second aspect of the invention includes: in order from an object side of the imaging lens, a first lens of a positive lens made of a glass material; a second lens of a negative lens made of a glass material and having a concave surface on an image side thereof; a third lens of a positive lens made of a plastic material and having a concave surface on an object side thereof, both surfaces of the third lens being aspheric; and a fourth lens of a meniscus lens made of a plastic material and having a convex surface on an object side thereof and near an optical axis, both surfaces of the fourth lens being aspheric, the imaging lens satisfying the following conditional expressions (1) to (2):

$$0.3 < |f_1/f_2| < 0.8 \tag{1}$$

$$v_{dG1} - v_{dG2} > 25 \tag{2}$$

$f_1$: Focal length of the first lens
$f_2$: Focal length of the second lens
$v_{dG1}$: Abbe number of the first lens
$v_{dG2}$: Abbe number of the second lens In both of the first and second lenses, each surface is preferably a spherical surface. The "spherical surface" includes a plane.

The "positive" or "negative" sign of the aspheric lens represents a refractive power near the optical axis.

An imaging lens according to a first aspect of the invention reduces the total length of a lens system by keeping the ratio of the focal length of the first lens to the focal length of the second lens within the range of the conditional expression (1). The difference of the Abbe number between the first lens and the second lens is above 25 in the conditional expression (2). Satisfying this condition allows satisfactory color aberration correction. By forming the two lenses on the object side with a material having a relatively small linear coefficient of expansion as shown by the conditional expressions (3) and (4), a lens system with a small focus shift responsive to a change in temperature is provided. In other words, a pan-focus lens is provided having a satisfactory temperature characteristic without increasing the total length of the lens system.

An imaging lens according to a second aspect of the invention uses a first and second lenses made of glass and a third and fourth lenses made of plastic and satisfies the conditional expressions (1) and (2). This offers the same working effect as an imaging lens of a first aspect of the invention.

DETAILED DESCRIPTION OF THE INVENTION

Figure 1:
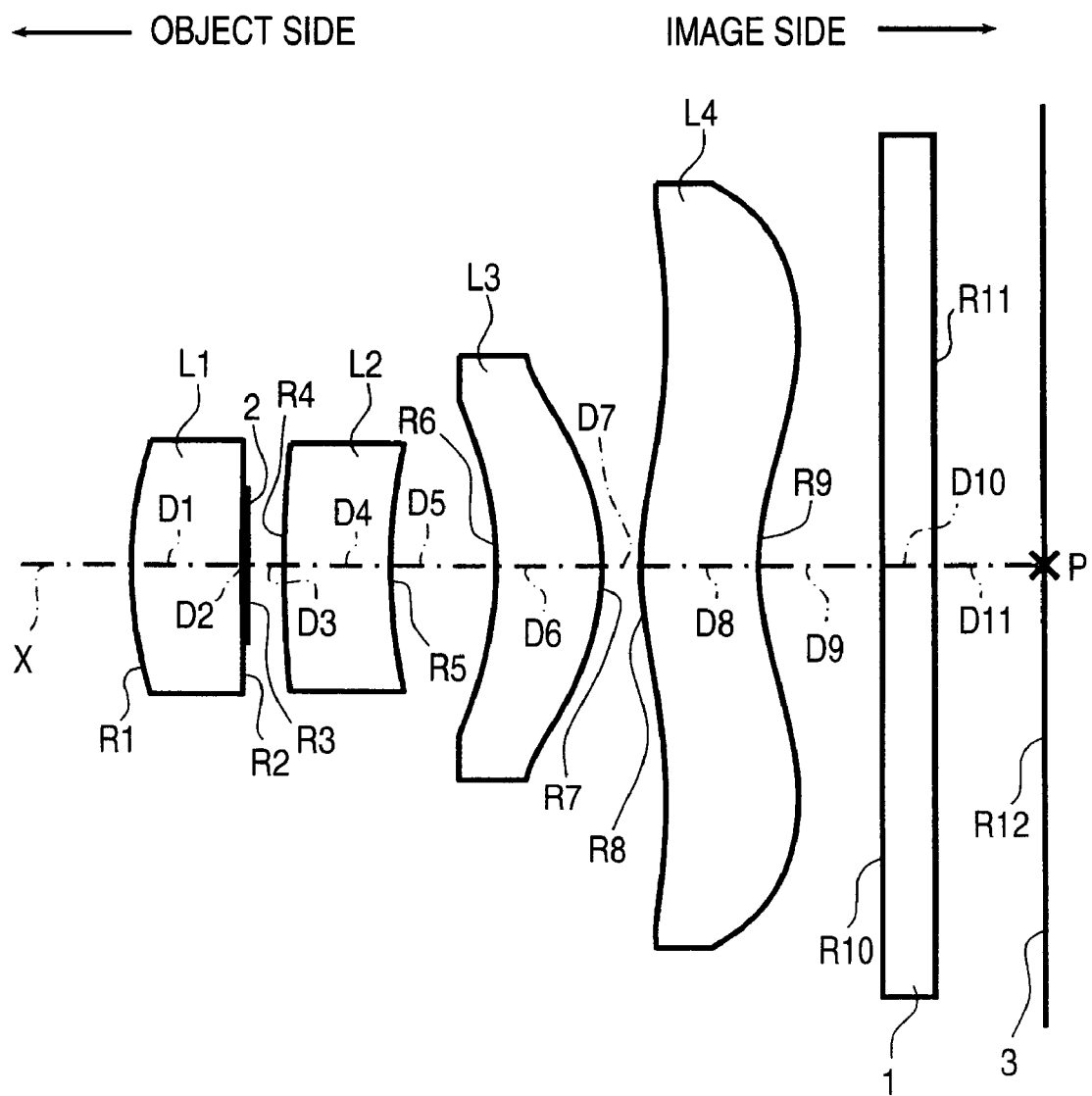
FIG. 1 is a schematic view showing the configuration of an imaging lens according to an exemplary embodiment 1 of the invention.

Exemplary embodiments of the invention will be described referring to drawings. An imaging lens according to an embodiment (Embodiment 1 is shown as a typical embodiment) shown in FIG. 1 includes: a first lens $L_1$ of a positive lens; a second lens $L_2$ of a negative lens having a concave surface on an image side thereof; a third lens $L_3$ of a positive meniscus lens, whose both surfaces are aspheric, having a concave surface on an object side thereof; and a fourth lens $L_4$ of a negative meniscus lens, whose both surfaces are aspheric; the lenses arranged in this order from an object side. The imaging lens efficiently causes the light flux incident along the optical axis to converge at an image forming position P of an imaging element 3 (imaging plane) 3. A diaphragm 2 is arranged at the image side of the first lens $L_1$ and a cover glass 1 is arranged between the fourth lens $L_4$ and the imaging element 3.

The aspheric shape of each lens surface is represented by the following aspheric equation:

$$Z = \frac{Y^2/R}{1+\sqrt{1-K \times Y^2/R^2}} + \sum_{i=3}^{10} B_i Y^i$$

In the equation, Z is a length of a normal from a point on an aspheric surface a distance Y away from the optical axis to the tangent (plane perpendicular to the optical axis) of an apex of the aspheric surface; Y is a distance from the optical axis; R is a curvature radius near the optical axis of an aspheric surface; K is an eccentricity; and $B_i$ is a coefficient of aspheric surface (i=3 to 10).

The imaging lens according to this embodiment satisfies the following conditional expressions (1) to (6):

$0.3 < |f_1/f_2| < 0.8$ (1)

$v_{dG1} - v_{dG2} > 25$ (2)

$|A1| < 1.5 \times 10^{-5}$ (3)

$|A2| < 1.5 \times 10^{-5}$ (4)

$|A3| > 1.5 \times 10^{-5}$ (5)

$|A4| > 1.5 \times 10^{-5}$ (6)

In the expressions, $f_1$ is a focal length of the first lens; $f_2$ is a focal length of the second lens; $v_{dG1}$ is Abbe number of the first lens; $v_{dG2}$ is Abbe number of the second lens; A1 is a linear coefficient of expansion of the first lens; A2 is a linear coefficient of expansion of the second lens; A3 is a linear coefficient of expansion of the third lens; and A4 is a linear coefficient of expansion of the fourth lens.

Next, the working effect of this embodiment will be described.

According to an imaging lens of this embodiment, mainly the first lens $L_1$ and the second lens $L_2$ have a light convergence function and a color aberration correction function while the thirst lens $L_3$ and the fourth lens $L_4$ have a function of correcting other aberrations such as spherical aberration.

An imaging lens according to this embodiment reduces the total length of a lens system by keeping the ratio of the focal length $f_1$ of the first lens $L_1$ to the focal length $f_2$ of the second lens $L_2$ within the range of the conditional expression (1). The difference of the Abbe number between the first lens $L_1$ and the second lens $L_2$ is above 25 from the conditional expression (2). Satisfying this condition allows satisfactory color aberration correction. By changing the first lens $L_1$ alone on the object side of the three plastic lenses described in Patient Reference 1 with two lenses made of a material having a relatively small linear coefficient of expansion as shown by the conditional expressions (3) and (4), a lens system with a small focus shift responsive to a change in temperature is provided. In other words, a pan-focus lens is provided having a satisfactory temperature characteristic without increasing the total length of the lens system by way of the imaging lens according to this embodiment.

An imaging lens according to this embodiment uses a first lens $L_1$ and a second lens $L_2$ that are made of glass as well as a third lens $L_3$ and a fourth lens $L_4$ that are made of plastic to eliminate the disadvantage caused by making all lenses with glass while offering two lenses on the object side with a smaller linear coefficient of expansion. Characteristics of a lens material that have a large influence on the variations in the focus position caused by a rise in temperature are refractive index and a linear coefficient of expansion (coefficient of cubic expansion). In general, a plastic material shows a considerable drop in the refractive index and a considerable rise in the linear coefficient of expansion with a rise in temperature. Using plastic as a lens material causes the refractive index and linear coefficient of expansion to work so as to increase the distance to the focus position. The first lens $L_1$ and second lens $L_2$ positioned on the object side and that are mainly in charge of the light convergence function are made of a glass material whose refractive index and linear coefficient of expansion are small with a rise in temperature in order to dramatically reduce the variations in the focus position.

Further, an imaging lens according to this embodiment satisfies the conditional expressions (1) and (2), thus providing the same working effect as the first imaging lens.

Technical meaning of the conditional expressions (1) to (6) will be described.

The conditional expression (1) specifies that the ratio of the focal length of the first lens $L_1$ to that of the second lens $L_2$ within a range of 0.3 to 0.8. This allows reduction of the total length of a lens system. In case the ratio exceeds the upper limit, the synthetic power of the first lens $L_1$ and the second lens $L_2$ is reduced and the total length of the lens system increases. In case the ratio drops below the lower limit, sufficient color aberration correction is difficult.

The conditional expression (2) specifies that the difference of the Abbe number between the first lens $L_1$ and the second lens $L_2$ exceeds 25. By using a low-dispersion lens for the first lens $L_1$ and a high-dispersion lens for the second lens $L_2$, tit is possible to perform satisfactory color aberration correction. In other words, when the difference drops below the lower limit, red range light is excessively over the green range light and the blue range light is excessively under the green range light, which makes it difficult to perform sufficient color aberration correction.

The conditional expressions (3) and (4) specify the upper limits of the coefficients of linear expansion of the first lens $L_1$ and the second lens $L_2$. The conditional expressions (5) and (6) specify the lower limits of the coefficients of linear expansion of the third lens $L_3$ and the fourth lens $L_4$. In particular, when the upper limit of the expressions (3) or (4) is exceeded, the focus shift increases and the lens system does not work properly.

An imaging lens according to the invention will be described using exemplary embodiments.

A numerical value shown in each of the following embodiments is a value standardized assuming that the focal length of the entire system is 1.0 mm.

<Embodiment 1>

General configuration of an imaging lens according to Embodiment 1 is shown in FIG. 1. The imaging lens includes: a first lens $L_1$ of a positive meniscus lens whose surface with a stronger curvature faces to the object side; a second lens $L_2$ of a negative a meniscus lens whose surface with a weaker curvature facing to an object side; a third lens $L_3$ of a positive meniscus lens, whose both surfaces are aspheric, having a concave surface facing to the object side; and a fourth lens $L_4$ of a negative meniscus lens whose both surfaces are aspheric; the lenses arranged in this order from an object side of the imaging lens. The fourth lens $L_4$ is designed to have a positive curvature near the optical axis and a negative curvature near the optical axis on the surface facing to the object side. On the surface facing to the image side also, the fourth lens $L_4$ is designed to show a similar change in the curvature sign although the ratio of change in the curvature is different. By arranging a diaphragm 2 between the first lens $L_1$ and the second lens $L_2$ (middle diaphragm configuration) such as the imaging lens of this embodiment and Embodiment 2 described below, it is possible to correct the curvature of field in a more favorable fashion.

Table 1 shows the values of the curvature radius R (mm) of each lens surface of the imaging lens, center thickness of each lens and air space between lenses (hereinafter generally referred to as an on-axial surface interval) D(mm), and refractive index N and Abbe number ν on the d line of each lens. Each number (surface number) in the table represents an order from the object (the third surface is a diaphragm plane and the twelfth surface is an imaging plane). Table 2 shows the values of constants K, $B_3$, $B_4$, $B_5$, $B_6$, $B_7$, $B_8$, $B_9$, and $B_{10}$ of the aspheric surfaces shown in the aspheric expression.

According to the imaging lens of Embodiment 1, as shown in Table 7, the conditional expressions (1) to (6) are all satisfied. The total length of the lens system is 1.28 mm.

Figure 2:
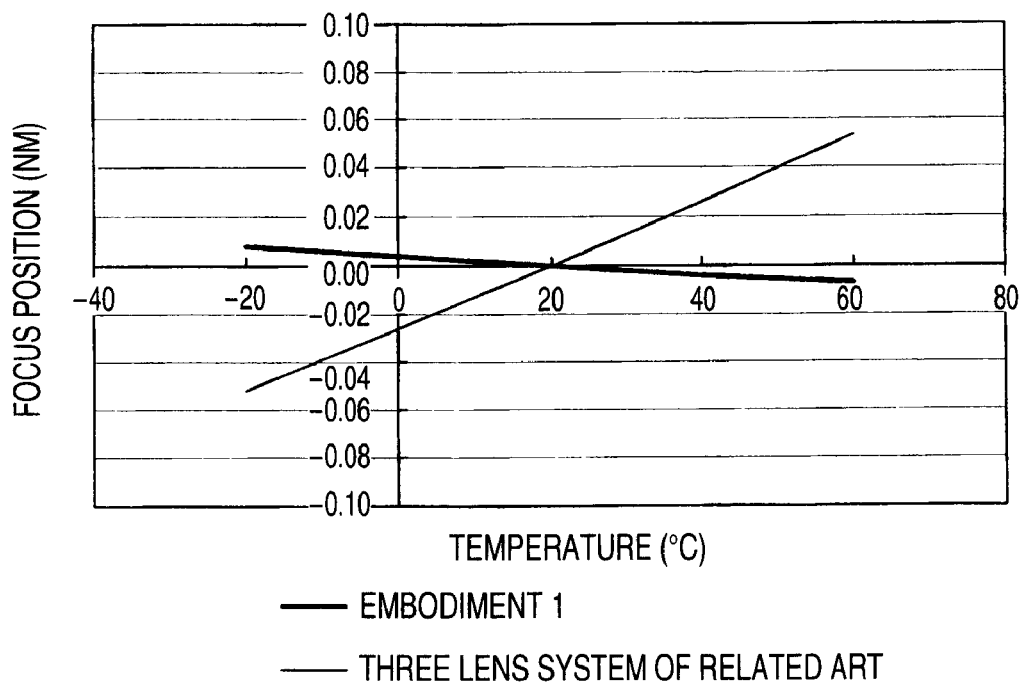
FIG. 2 is a graph showing deviation of the focus position corresponding to a change in the temperature of an imaging lens according to an exemplary embodiment 1.

FIG. 2 shows deviation of the focus position corresponding to a change in the temperature of the imaging lens according to Embodiment 1. While the variations in the focus position fall within the range of approximately ±0.05 mm with respect to the change in temperature of −20 to 60° C. concerning the related art plastic lens system (for example, the lens disclosed in JP-A-2003-322792 described above; ditto for the following), this embodiment shows variations in the focus position within a satisfactory range of ±0.01 mm with respect to the same change in the temperature.

Figure 3:
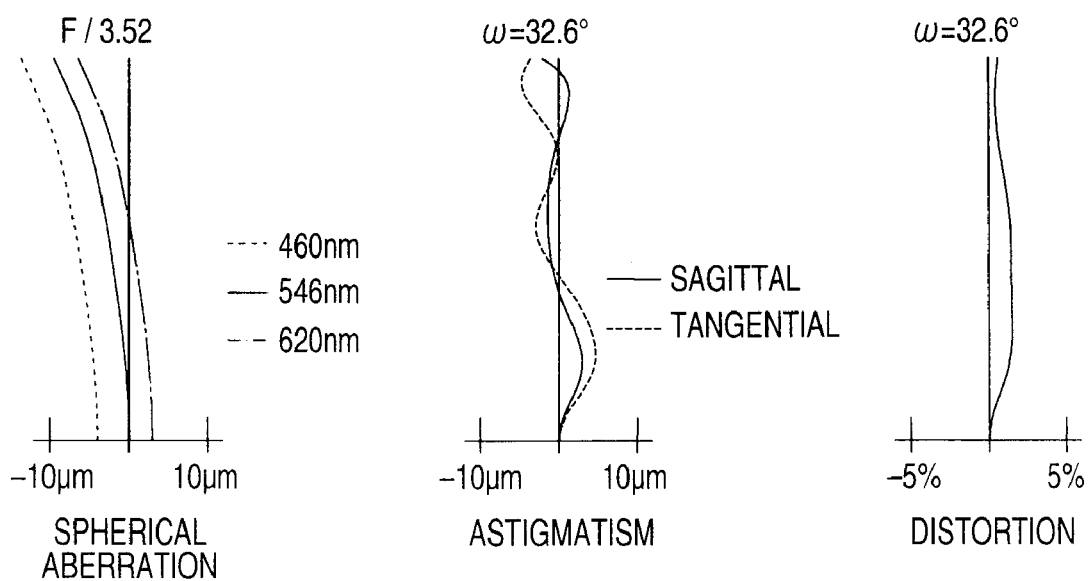
FIG. 3 is an aberration chart showing aberrations (spherical aberration, astigmatism and distortion) of an imaging lens according to an exemplary embodiment 1.

FIG. 3 is an aberration chart showing the spherical aberration, astigmatism, and distortion of the imaging lens according to Embodiment 1. The astigmatism chart shows the aberration with respect to each of a sagittal image plane and tangential image plane. In these aberration charts, ω represents a half field angle. As understood from these aberration charts, the imaging lens according to Embodiment 1 performs satisfactory aberration correction.

<Embodiment 2>

Figure 4:
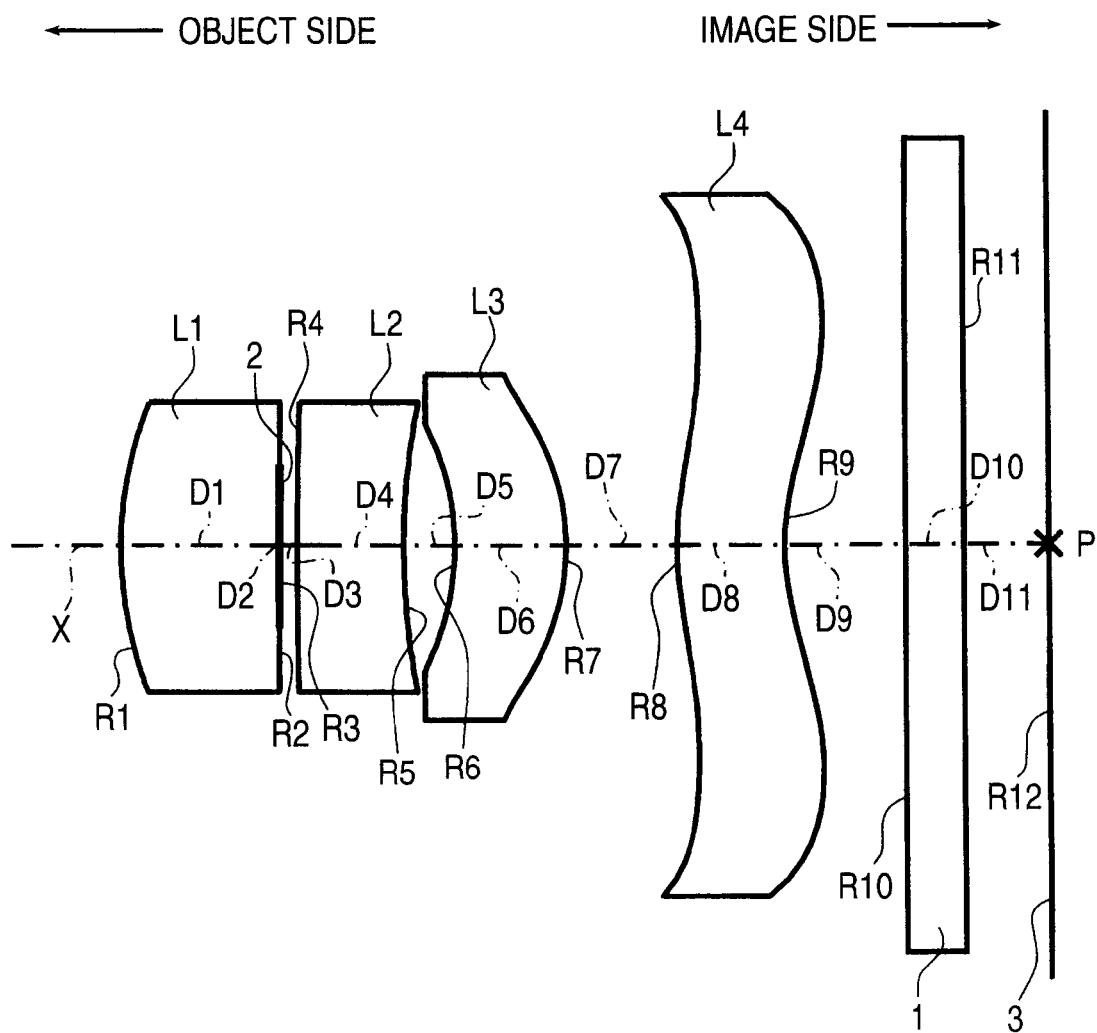
FIG. 4 is a schematic view showing the configuration of an imaging lens according to an exemplary embodiment 2 of the invention.

General configuration of an imaging lens according to Embodiment 2 is shown in FIG. 4. Configuration of this imaging lens is approximately the same as that in Embodiment 1. Same elements are given same signs in the description of corresponding drawings and duplicated description is omitted. The imaging lens has a second lens $L_2$ closer to the first lens $L_1$ and a third lens $L_3$ closer to the second lens $L_2$ than the imaging lens according to Embodiment 1.

Table 3 shows the values of the curvature radius R (mm) of each lens surface of the imaging lens, the on-axial surface interval of each lens D(mm), and refractive index N and Abbe number ν on the d line of each lens. Each number (surface number) in the table represents an order from the object (the third surface is a diaphragm plane and the twelfth surface is an imaging plane). Table 4 shows the values of constants K, $B_3$, $B_4$, $B_5$, $B_6$, $B_7$, $B_8$, $B_9$, and $B_{10}$ of the aspheric surfaces shown in the aspheric expression.

TABLE 1

| | Surface Number | R | D | $N_d$ | $v_d$ |
|---|---|---|---|---|---|
| | 1 | 0.5967 | 0.15526 | 1.754999 | 52.3 |
| | 2 | 3.5220 | 0.00494 | | |
| STO (diaphragm) | 3 | ∞ | 0.05273 | | |
| | 4 | 1.7077 | 0.14773 | 1.922860 | 19.0 |
| | 5 | 0.8033 | 0.14826 | | |
| | *6 | −0.5427 | 0.14920 | 1.508692 | 56.0 |
| | *7 | −0.3636 | 0.05441 | | |
| | *8 | 0.5036 | 0.16305 | 1.508692 | 56.0 |
| | *9 | 0.3724 | 0.17405 | | |
| | 10 | ∞ | 0.07458 | 1.516330 | 64.0 |
| | 11 | ∞ | 0.15640 | | |
| IMG (imaging plane) | 12 | ∞ | | | |

*Aspheric surface

TABLE 3

| | Surface Number | R | D | $N_d$ | $v_d$ |
|---|---|---|---|---|---|
| | 1 | 0.5832 | 0.22660 | 1.758435 | 52.3 |
| | 2 | ∞ | 0.00000 | | |
| STO (diaphragm) | 3 | ∞ | 0.02520 | | |
| | 4 | 9.8082 | 0.14917 | 1.934282 | 19.0 |
| | 5 | 1.1196 | 0.07109 | | |
| | *6 | −0.4179 | 0.15933 | 1.510810 | 56.0 |
| | *7 | −0.3415 | 0.15731 | | |
| | *8 | 0.5619 | 0.15175 | 1.510810 | 56.0 |
| | *9 | 0.4274 | 0.16965 | | |
| | 10 | ∞ | 0.08522 | 1.518249 | 64.0 |
| | 11 | ∞ | 0.11983 | | |
| IMG (imaging plane) | 12 | ∞ | | | |

*Aspheric surface

TABLE 2

| Surface Number | K | $B_3$ | $B_4$ | $B_5$ | $B_6$ | $B_7$ | $B_8$ | $B_9$ | $B_{10}$ |
|---|---|---|---|---|---|---|---|---|---|
| 6 | $5.667 \times 10^{-1}$ | $6.695 \times 10^{-1}$ | −5.055 | $1.853 \times 10$ | $-3.709 \times 10$ | $-4.941 \times 10^2$ | $1.216 \times 10^3$ | $6.840 \times 10^3$ | $-1.278 \times 10^4$ |
| 7 | $9.955 \times 10^{-1}$ | $7.316 \times 10^{-1}$ | −3.739 | 4.445 | $2.715 \times 10$ | $1.202 \times 10$ | $-1.708 \times 10^2$ | $1.043 \times 10^3$ | $3.124 \times 10^3$ |
| 8 | $6.439 \times 10^{-1}$ | $7.877 \times 10^{-1}$ | $-1.819 \times 10$ | $1.272 \times 10$ | $7.734 \times 10$ | $-5.347 \times 10$ | $-2.253 \times 10^2$ | $1.578 \times 10^2$ | $1.369 \times 10^2$ |
| 9 | $-8.030 \times 10^{-2}$ | 1.787 | $-3.231 \times 10$ | $8.636 \times 10$ | $-6.341 \times 10$ | $-1.270 \times 10^2$ | $1.940 \times 10^2$ | $1.423 \times 10^2$ | $-2.995 \times 10^2$ |

TABLE 4

| Surface Number | K | $B_3$ | $B_4$ | $B_5$ | $B_6$ | $B_7$ | $B_8$ | $B_9$ | $B_{10}$ |
|---|---|---|---|---|---|---|---|---|---|
| 6 | 2.869 | $7.047 \times 10^{-1}$ | −5.459 | $2.053 \times 10$ | $−4.216 \times 10$ | $−5.762 \times 10^2$ | $5.710 \times 10^3$ | $1.545 \times 10^4$ | $−4.899 \times 10^4$ |
| 7 | 1.004 | 1.007 | −7.736 | $1.227 \times 10$ | $4.586 \times 10$ | $2.506 \times 10$ | $−1.395 \times 10^2$ | $1.827 \times 10^3$ | $5.942 \times 10^3$ |
| 8 | $5.352 \times 10^{-1}$ | 1.588 | $−2.056 \times 10$ | $1.301 \times 10$ | $8.945 \times 10$ | $−5.717 \times 10$ | $−2.622 \times 10^2$ | $1.915 \times 10^2$ | $1.150 \times 10^2$ |
| 9 | −1.558 | 3.083 | $−3.557 \times 10$ | $9.699 \times 10$ | $−7.309 \times 10$ | $−1.484 \times 10^2$ | $2.352 \times 10^2$ | $1.729 \times 10^2$ | $−3.789 \times 10^2$ |

According to the imaging lens of Embodiment 2, as shown in Table 7, the conditional expressions (1) to (6) are all satisfied. The total length of the lens system is 1.31 mm.

Figure 5:
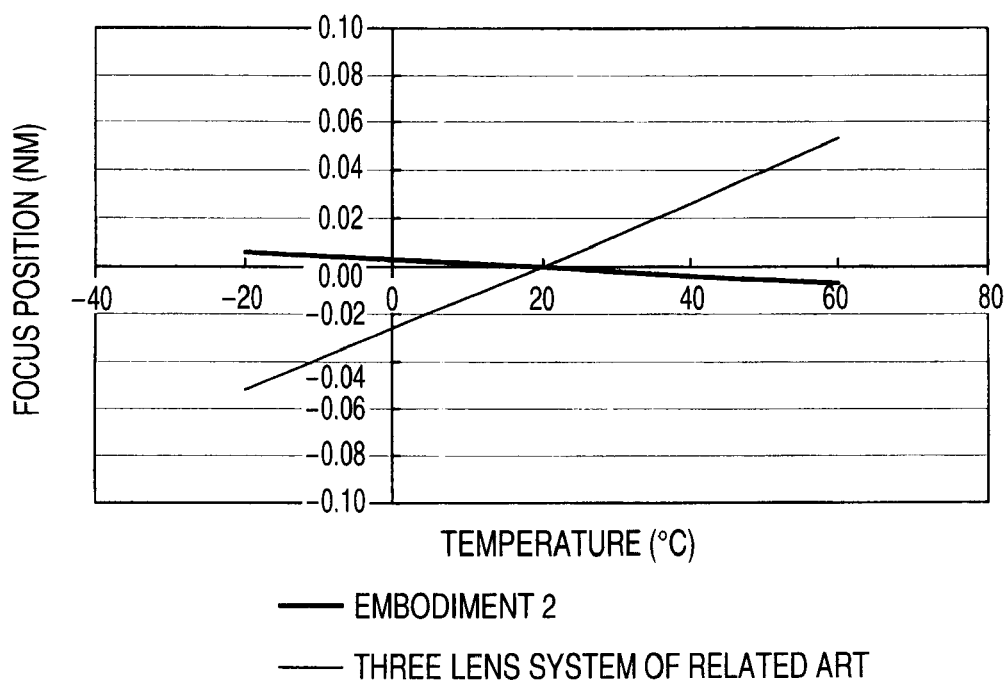
FIG. 5 is a graph showing deviation of the focus position corresponding to a change in the temperature of an imaging lens according to an exemplary embodiment 2.

FIG. 5 shows deviation of the focus position corresponding to a change in the temperature of the imaging lens according to Embodiment 2. Same as Embodiment 1, while the variations in the focus position fall within the range of approximately ±0.05 mm with respect to the change in temperature of −20 to 60° C. concerning the related art plastic lens system, this embodiment shows variations in the focus position within a satisfactory range of ±0.01 mm with respect to the same change in the temperature.

Figure 6:
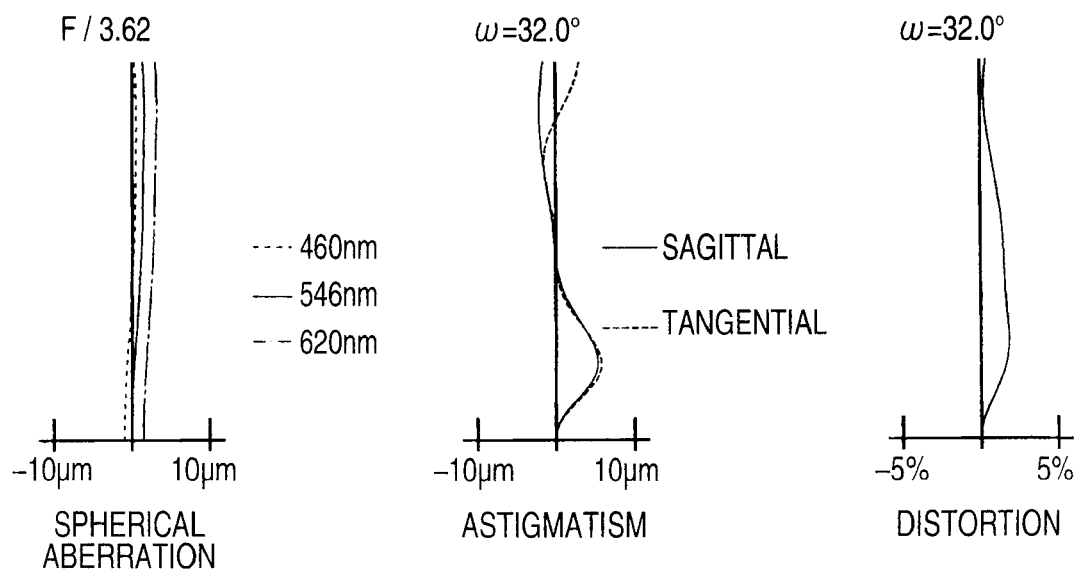
FIG. 6 is an aberration chart showing aberrations (spherical aberration, astigmatism and distortion) of an imaging lens according to an exemplary embodiment 2.

FIG. 6 is an aberration chart showing the spherical aberration, astigmatism, and distortion of the imaging lens according to Embodiment 2. The astigmatism chart shows the aberration with respect to each of a sagittal image plane and tangential image plane. In these aberration charts, o represents a half field angle. As understood from these aberration charts, the imaging lens according to Embodiment 2 performs satisfactory aberration correction.

TABLE 5

| Surface Number | R | D | $N_d$ | $v_d$ |
|---|---|---|---|---|
| STO (diaphragm) | 1 | 0.5764 | 0.28716 | 1.758435 | 52.3 |
| | 2 | ∞ | 0.10652 | 1.934282 | 19.0 |
| | 3 | 1.1228 | 0.12319 | | |
| *4 | | −0.5131 | 0.18650 | 1.510810 | 56.0 |
| *5 | | −0.2948 | 0.04148 | | |
| *6 | | 0.5621 | 0.13812 | 1.510810 | 56.0 |
| *7 | | 0.3115 | 0.16718 | | |
| 8 | | ∞ | 0.08398 | 1.518249 | 64.0 |
| 9 | | ∞ | 0.19186 | | |
| IMG (imaging plane) | 10 | ∞ | | | |

*Aspheric surface

TABLE 6

| Surface Number | K | $B_3$ | $B_4$ | $B_5$ | $B_6$ | $B_7$ | $B_8$ | $B_9$ | $B_{10}$ |
|---|---|---|---|---|---|---|---|---|---|
| 4 | 2.680 | $7.257 \times 10^{-1}$ | −5.704 | $2.177 \times 10$ | $−4.537 \times 10$ | $−6.292 \times 10^2$ | $3.569 \times 10^3$ | $−1.011 \times 10^4$ | $3.250 \times 10^4$ |
| 5 | $5.108 \times 10^{-1}$ | 1.747 | −5.922 | 9.169 | 7.959 | $−7.589 \times 10$ | $−2.333 \times 10^2$ | $2.084 \times 10^3$ | $2.451 \times 10^3$ |
| 6 | $−8.836 \times 10^{-2}$ | 1.996 | $−2.258 \times 10$ | $1.495 \times 10$ | $9.958 \times 10$ | $−5.734 \times 10$ | $−2.847 \times 10^2$ | $2.173 \times 10^2$ | $1.122 \times 10^2$ |
| 7 | $1.790 \times 10^{-1}$ | 1.300 | $−3.652 \times 10$ | $1.030 \times 10^2$ | $−7.890 \times 10$ | $−1.634 \times 10^2$ | $2.585 \times 10^2$ | $1.975 \times 10^2$ | $−4.028 \times 10^2$ |

<Embodiment 3>

Figure 7:
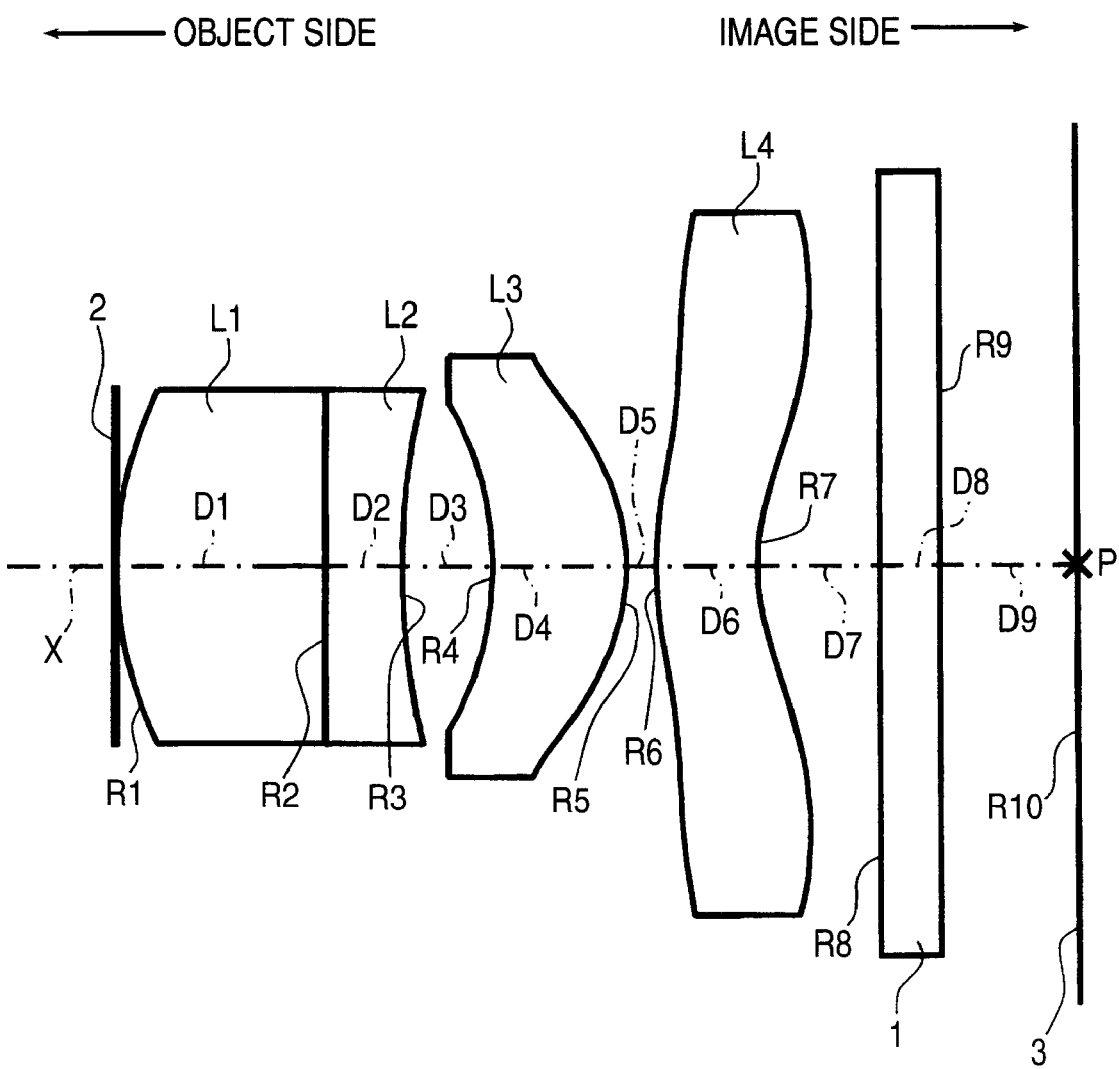
FIG. 7 is a schematic view showing the configuration of an imaging lens according to an exemplary embodiment 3 of the invention.

General configuration of an imaging lens according to Embodiment 3 is shown in FIG. 7. Configuration of this imaging lens is approximately the same as that in Embodiment 1. Same elements are given same signs in the description of corresponding drawings and duplicated description is omitted. In the imaging lens, the first lens $L_1$ and a second lens $L_2$ are bonded together and a diaphragm 2 is arranged to come into contact with the surface of the first lens $L_1$ facing to the object side. In other words, the front diaphragm configuration is used.

Table 5 shows the values of the curvature radius R (mm) of each lens surface of the imaging lens, the on-axial surface interval of each lens D(mm), and refractive index N and Abbe number v on the d line of each lens. Each number (surface number) in the table represents an order from the object (the first surface is a diaphragm plane and the surface of the first lens $L_1$ facing to the object side, and the tenth surface is an imaging plane). Table 6 shows the values of constants K, $B_3$, $B_4$, $B_5$, $B_6$, $B_7$, $B_8$, $B_9$, and $B_{10}$ of the aspheric surfaces shown in the aspheric expression.

According to the imaging lens of Embodiment 3, as shown in Table 7, the conditional expressions (1) to (6) are all satisfied. The total length of the lens system is 1.32 mm.

Figure 8:
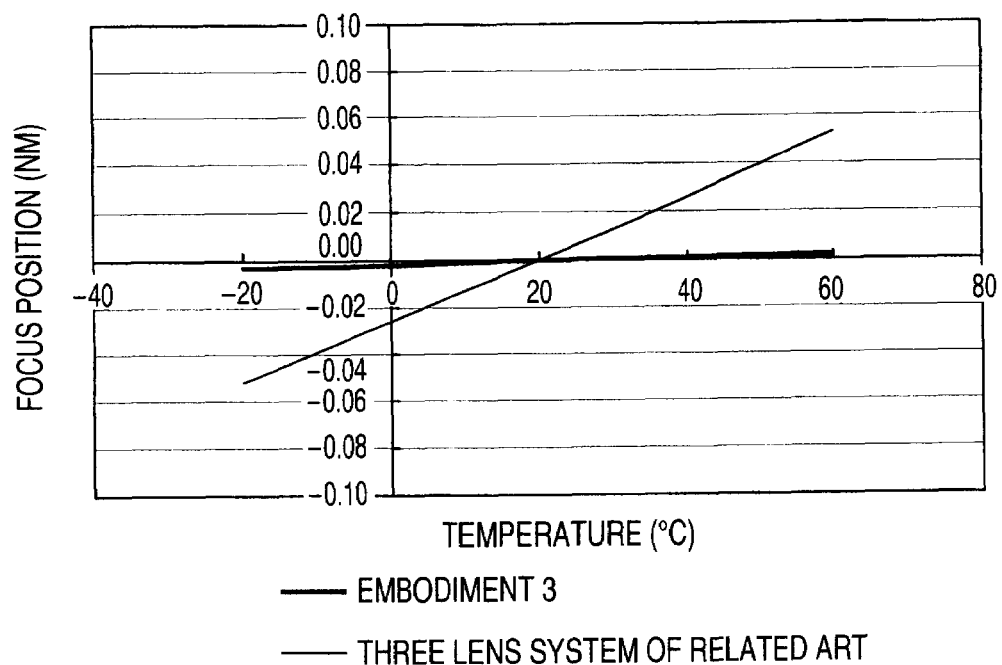
FIG. 8 is a graph showing deviation of the focus position corresponding to a change in the temperature of an imaging lens according to an exemplary embodiment 3.

FIG. 8 shows deviation of the focus position corresponding to a change in the temperature of the imaging lens according to Embodiment 2. Same as Embodiment 1, while the variations in the focus position fall within the range of approximately ±0.05 mm with respect to the change in temperature of −20 to 60° C. concerning the related art plastic lens system, this embodiment shows variations in the focus position within the most satisfactory range of ±0.005 mm of all embodiments with respect to the same change in the temperature.

Figure 9:
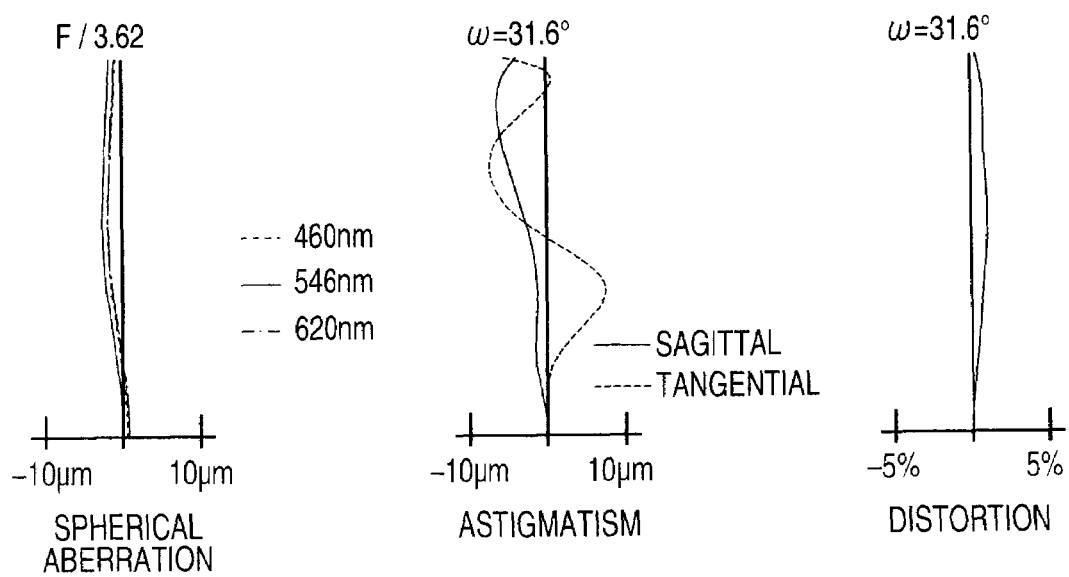
FIG. 9 is an aberration chart showing aberrations (spherical aberration, astigmatism and distortion) of an imaging lens according to an exemplary embodiment 3.

FIG. 9 is an aberration chart showing the spherical aberration, astigmatism, and distortion of the imaging lens according to Embodiment 3. The astigmatism chart shows the aberration with respect to each of a sagittal image plane and tangential image plane. In these aberration charts, ω represents a half field angle. As understood from these aberration charts, the imaging lens according to Embodiment 3 performs satisfactory aberration correction.

TABLE 7

|  | Embodiment 1 | Embodiment 2 | Embodiment 3 |
|---|---|---|---|
| $f_1$ | 0.9302288 | 0.7689704 | 0.7599297 |
| $f_2$ | −1.7831481 | −1.3640829 | −1.2017591 |
| $f_1/f_2$ | −0.5216778 | −0.5637270 | −0.6323478 |
| $v_{dG1}$ | 52.3 | 52.3 | 52.3 |
| $v_{dG2}$ | 19.0 | 19.0 | 19.0 |
| A1 (×10$^{-5}$) | 0.58 | 0.58 | 0.58 |
| A2 (×10$^{-5}$) | 0.67 | 0.67 | 0.67 |
| A3 (×10$^{-5}$) | 6 | 6 | 6 |
| A4 (×10$^{-5}$) | 6 | 6 | 6 |

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. 2005-195545, filed Jul. 4, 2005, the contents of which are incorporated herein by reference.

What is claimed is:

1. An imaging lens comprising: in order from an object side of the imaging lens,
   a first lens of a positive lens;
   a second lens of a negative lens having a concave surface on an image side thereof;
   a third lens of a positive lens having a concave surface on an object side thereof, wherein both surfaces of the third lens are aspheric; and
   a fourth lens of a meniscus lens having a convex surface on an object side thereof and near an optical axis, wherein both surfaces of the fourth lens are aspheric,
   the imaging lens satisfying conditional expressions (1) to (6):

$$0.3 < |f_1/f_2| < 0.8 \quad (1)$$

$$v_{dG1} - v_{dG2} > 25 \quad (2)$$

$$|A1| < 1.5 \times 10^{-5} \times 1/°\text{C}. \quad (3)$$

$$|A2| < 1.5 \times 10^{-5} \times 1/°\text{C}. \quad (4)$$

$$|A3| > 1.5 \times 10^{-5} \times 1/°\text{C}. \quad (5)$$

$$|A4| > 1.5 \times 10^{-5} \times 1/°\text{C}. \quad (6)$$

wherein
$f_1$ represents a focal length of the first lens,
$f_2$ represents a focal length of the second lens,
$v_{dG1}$ represents Abbe number of the first lens,
$v_{dG2}$ represents Abbe number of the second lens,
A1 represents a linear coefficient of expansion of the first lens,
A2 represents a linear coefficient of expansion of the second lens,
A3 represents a linear coefficient of expansion of the third lens, and
A4 represents a linear coefficient of expansion of the fourth lens.

2. The imaging lens according to claim 1, wherein both surfaces of the first lens are aspheric, and both surfaces of the second lens are spherical.

3. The imaging lens according to claim 2, wherein said spherical surfaces include a plane.

4. The imaging lens according to claim 1, wherein said third lens is a positive meniscus lens.

5. The imaging lens according to claim 1, further comprising a diaphragm arranged at the image side of said first lens.

6. The imaging lens according to claim 1, wherein said first lens and said second lens have a light convergence function and a color aberration correction function, and said third lens and said fourth lens have a function of correcting aberrations such as spherical aberration.

7. The imaging lens according to claim 1, wherein at least one of said first lens and said second lens is made of glass.

8. The imaging lens according to claim 1, wherein at least one of said third lens and said fourth lens is made of plastic.

9. The imaging lens according to claim 1, wherein said first lens and said second lens are made of a glass material whose refractive index and linear coefficient of expansion are small with a rise in temperature, to reduce variations in the focus position.

10. The imaging lens according to claim 1, wherein said first lens is a positive meniscus lens.

11. The imaging lens according to claim 1, wherein said second lens is a negative meniscus lens.

12. The imaging lens according to claim 1, wherein said first lens is a positive meniscus lens whose surface with a stronger curvature faces to the object side, and said second lens is a negative a meniscus lens whose surface with a weaker curvature faces to an object side.

13. The imaging lens according to claim 1, wherein
   said fourth lens is designed to have a positive curvature near the optical axis and a negative curvature near the optical axis on the surface facing to the object side, and
   on the surface facing to the image side, the fourth lens is designed to show a similar change in the curvature sign.

14. The imaging lens according to claim 1, wherein said first lens and said second lens are bonded together.

15. The imaging lens according to claim 14, wherein a diaphragm is arranged to come into contact with the surface of said first lens facing to the object side.

16. An imaging lens comprising: in order from an object side of the imaging lens,
   a first lens of a positive lens made of a glass material;
   a second lens of a negative lens made of a glass material and having a concave surface on an image side thereof;
   a third lens of a positive lens made of a plastic material and having a concave surface on an object side thereof, wherein both surfaces of the third lens are aspheric; and
   a fourth lens of a meniscus lens made of a plastic material and having a convex surface on an object side thereof and near an optical axis, wherein both surfaces of the fourth lens are aspheric,
   the imaging lens satisfying conditional expressions (1) to (2):

$$0.3 < |f_1/f_2| < 0.8 \quad (1)$$

$$v_{dG1} - v_{dG2} > 25 \quad (2)$$

wherein
$f_1$ represents a focal length of the first lens,
$f_2$ represents a focal length of the second lens,
$v_{dG1}$ represents Abbe number of the first lens, and
$v_{dG2}$ represents Abbe number of the second lens.

17. The imaging lens according to claim 16, wherein both surfaces of the first lens are spherical, and both surfaces of the second lens are spherical.

18. The imaging lens according to claim 17, wherein said spherical surfaces include a plane.

19. The imaging lens according to claim 16, wherein said third lens is a positive meniscus lens.

20. The imaging lens according to claim 16, further comprising a diaphragm arranged at the image side of said first lens.

21. The imaging lens according to claim 16, wherein said first lens and said second lens have a light convergence function and a color aberration correction function, and said third lens and said fourth lens have a function of correcting aberrations such as spherical aberration.

22. The imaging lens according to claim 16, wherein said first lens is a positive meniscus lens.

23. The imaging lens according to claim 16, wherein said second lens is a negative meniscus lens.

24. The imaging lens according to claim 16, wherein said first lens is a positive meniscus lens whose surface with a stronger curvature faces to the object side, and said second lens is a negative a meniscus lens whose surface with a weaker curvature faces to an object side.

25. The imaging lens according to claim 16, wherein said fourth lens is designed to have a positive curvature near the optical axis and a negative curvature near the optical axis on the surface facing to the object side, and on the surface facing to the image side, the fourth lens is designed to show a similar change in the curvature sign.

26. The imaging lens according to claim 16, wherein said first lens and said second lens are bonded together.

27. The imaging lens according to claim 26, wherein a diaphragm is arranged to come into contact with the surface of said first lens facing to the object side.

28. An imaging lens comprising: in order from an object side of the imaging lens,
a first lens of a positive lens;
a second lens of a negative lens having a concave surface on an image side thereof;
a third lens of a positive lens having a concave surface on an object side thereof, wherein both surfaces of the third lens are aspheric; and
a fourth lens of a meniscus lens having a convex surface on an object side thereof and near an optical axis, wherein both surfaces of the fourth lens are aspheric,
the imaging lens satisfying conditional expressions (1) and (2):

$$0.3 < |f_1/f_2| < 0.8 \tag{1}$$

$$v_{dG1} - v_{dG2} > 25 \tag{2}$$

wherein
$f_1$ represents a focal length of the first lens,
$f_2$ represents a focal length of the second lens,
$v_{dG1}$ represents Abbe number of the first lens,
$v_{dG2}$ represents Abbe number of the second lens, and
wherein said first and second lenses have relatively small linear coefficients of expansion, and said third and fourth lenses have linear coefficients of expansion which are larger than the liner coefficients of expansion of said first and second lenses.

29. An imaging lens comprising: in order from an object side of the imaging lens,
a first lens of a positive lens;
a second lens of a negative lens having a concave surface on an image side thereof;
a third lens of a positive lens having a concave surface on an object side thereof, wherein both surfaces of the third lens are aspheric; and
a fourth lens of a meniscus lens having a convex surface on an object side thereof and near an optical axis, wherein both surfaces of the fourth lens are aspheric,
the imaging lens satisfying conditional expressions (1) and (2):

$$0.3 < |f_1/f_2| < 0.8 \tag{1}$$

$$v_{dG1} - v_{dG2} > 25 \tag{2}$$

wherein
$f_1$ represents a focal length of the first lens,
$f_2$ represents a focal length of the second lens,
$v_{dG1}$ represents Abbe number of the first lens, and
$v_{dG2}$ represents Abbe number of the second lens, and
wherein liner coefficients of expansion of said first and second lenses are smaller than linear coefficients of expansion of said third and fourth lenses.

* * * * *

UNITED STATES PATENT AND TRADEMARK OFFICE
CERTIFICATE OF CORRECTION

| | | |
|---|---|---|
| PATENT NO. | : 7,443,611 B2 | Page 1 of 1 |
| APPLICATION NO. | : 11/477919 | |
| DATED | : October 28, 2008 | |
| INVENTOR(S) | : Yoshikazu Shinohara | |

It is certified that error appears in the above-identified patent and that said Letters Patent is hereby corrected as shown below:

(Column 9, Line 64):

Change "aspheric" to --spherical--

Signed and Sealed this

Fifteenth Day of September, 2009

David J. Kappos
*Director of the United States Patent and Trademark Office*